United States Patent
Tagawa et al.

(10) Patent No.: US 9,726,120 B2
(45) Date of Patent: Aug. 8, 2017

(54) VAPORIZED FUEL PROCESSING APPARATUS

(71) Applicant: AISAN KOGYO KABUSHIKI KAISHA, Obu-shi, Aichi-ken (JP)

(72) Inventors: Naoyuki Tagawa, Nagoya (JP); Minoru Akita, Ama (JP); Yoshikazu Miyabe, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 244 days.

(21) Appl. No.: 14/561,818

(22) Filed: Dec. 5, 2014

(65) Prior Publication Data
US 2015/0159598 A1   Jun. 11, 2015

(30) Foreign Application Priority Data

Dec. 6, 2013  (JP) .................................. 2013-252871

(51) Int. Cl.
| | |
|---|---|
| *F02M 25/08* | (2006.01) |
| *F02D 41/00* | (2006.01) |
| *F02D 41/24* | (2006.01) |

(52) U.S. Cl.
CPC ....... *F02M 25/089* (2013.01); *F02D 41/0077* (2013.01); *F02D 41/2432* (2013.01);
(Continued)

(58) Field of Classification Search
CPC ............... F02M 25/08; F02M 25/0809; F02M 25/0836; F02M 25/0845; F02M 25/0854;
(Continued)

(56) References Cited

U.S. PATENT DOCUMENTS

| | | | | |
|---|---|---|---|---|
| 5,911,209 A | * | 6/1999 | Kouda | ............... F02M 25/0809 123/198 D |
| 6,220,229 B1 | * | 4/2001 | Kawamura | ........ F02M 25/0809 123/520 |

(Continued)

FOREIGN PATENT DOCUMENTS

| | | |
|---|---|---|
| DE | 19838959 A1 | 3/2000 |
| DE | 102010014558 A1 | 10/2011 |

(Continued)

OTHER PUBLICATIONS

German Patent Application No. DE 10 2014 017 158.2 Office Action dated Jun. 16, 2015 (7 pages).

*Primary Examiner* — Mahmoud Gimie
*Assistant Examiner* — John Zaleskas
(74) *Attorney, Agent, or Firm* — Conley Rose, P.C.

(57) ABSTRACT

A vaporized fuel processing apparatus has a canister capable of adsorbing vaporized fuel generated in a fuel tank, a vapor path connecting the canister to the fuel tank, a closing valve provided in the vapor path, a purge path connecting the canister to an intake path of an engine, a pressure sensor for detecting the inner pressure of the fuel tank, and an electric control unit controlling the vaporized fuel processing apparatus. When the inner pressure of the fuel tank is in excess of the measurement range of the pressure sensor, the learning of the valve opening start position is prohibited, and pre-learning depressurization control is performed through change of the stroke amount of the closing valve in the valve opening direction until the inner pressure of the fuel tank is within the measurement range of the pressure sensor.

2 Claims, 11 Drawing Sheets

(52) U.S. Cl.
CPC ..... *F02D 41/2464* (2013.01); *F02M 25/0836* (2013.01); *F02M 25/0854* (2013.01); *F02D 2200/0602* (2013.01); *Y02T 10/47* (2013.01)

(58) Field of Classification Search
CPC . F02M 25/089; F02D 41/004; F02D 41/0077; F02D 41/2429; F02D 41/2432; F02D 41/2438; F02D 41/2441; F02D 41/2445; F02D 41/2448; F02D 41/2451; F02D 41/2464; F02D 41/2477
USPC .......................................... 123/516, 518–521
See application file for complete search history.

(56) References Cited

U.S. PATENT DOCUMENTS

| | | | | |
|---|---|---|---|---|
| 6,276,343 B1* | 8/2001 | Kawamura | ........ | F02M 25/0809 123/516 |
| 6,338,336 B1* | 1/2002 | Iida | ..................... | F02D 41/0042 123/520 |
| 8,607,765 B2 | 12/2013 | Hagen | | |
| 2002/0088441 A1* | 7/2002 | Weldon | .............. | F02M 25/0836 123/520 |
| 2011/0168931 A1* | 7/2011 | Sugiura | .................. | F16K 1/443 251/129.15 |
| 2011/0203554 A1* | 8/2011 | Horiba | ................ | F02D 41/0032 123/520 |
| 2011/0220071 A1* | 9/2011 | Horiba | .............. | F02M 25/0836 123/520 |
| 2011/0253110 A1* | 10/2011 | Fukui | ................... | F02D 41/004 123/520 |
| 2011/0284781 A1* | 11/2011 | Keller | ................ | F02M 25/0836 251/129.15 |
| 2011/0296997 A1* | 12/2011 | Sugiura | .............. | F02M 25/0836 96/147 |
| 2012/0097269 A1* | 4/2012 | Horiba | ............... | F02M 25/0854 137/551 |
| 2012/0211687 A1* | 8/2012 | Benjey | ............. | B60K 15/03519 251/248 |
| 2014/0102420 A1* | 4/2014 | Kimoto | .............. | F02M 25/0836 123/520 |
| 2015/0143996 A1* | 5/2015 | Kimoto | .............. | B01D 53/0454 96/114 |
| 2015/0144111 A1* | 5/2015 | Akita | .................. | F02M 25/0836 123/519 |
| 2015/0159566 A1* | 6/2015 | Akita | .................... | F02D 41/003 137/488 |
| 2015/0159567 A1* | 6/2015 | Akita | .................... | F02D 41/003 137/624.27 |
| 2015/0159568 A1* | 6/2015 | Tagawa | .................. | F02D 41/003 137/624.27 |
| 2015/0159598 A1* | 6/2015 | Tagawa | .............. | F02M 25/0854 123/520 |
| 2015/0292447 A1* | 10/2015 | Tagawa | .............. | F02M 25/0809 137/198 |
| 2015/0322902 A1* | 11/2015 | Akita | ................. | F02M 25/0809 123/519 |
| 2015/0330337 A1* | 11/2015 | Tagawa | ................. | F02D 41/222 123/519 |
| 2015/0330338 A1* | 11/2015 | Ito | ..................... | F02M 25/0836 123/520 |

FOREIGN PATENT DOCUMENTS

| | | |
|---|---|---|
| DE | 102013016984 A1 | 4/2014 |
| JP | 05-33729 A | 2/1993 |
| JP | 08-74678 A | 3/1996 |
| JP | 10-299583 A | 11/1998 |
| JP | 10-299586 A | 11/1998 |
| JP | 2004-156496 A | 6/2004 |
| JP | 2004-308483 A | 11/2004 |
| JP | 2005-155323 A | 6/2005 |
| JP | 2005256624 A * | 9/2005 |
| JP | 2010-281258 A | 12/2010 |
| JP | 2011-256778 A | 12/2011 |
| JP | 2013-104316 A | 5/2013 |
| JP | 2013-113198 A | 6/2013 |

* cited by examiner

| PURGE-OFF TIME(sec) | 5 | 10 | 15 | 20 |
|---|---|---|---|---|
| VALVE OPENING RESUMING POSITION | STORED VALUE | STORED VALUE $-\alpha 1$ | STORED VALUE $-\alpha 2$ | 0 |

$\alpha 2 > \alpha 1$

VAPORIZED FUEL PROCESSING APPARATUS

CROSS-REFERENCE TO RELATED APPLICATIONS

This application claims priority to Japanese patent application serial number 2013-252871, filed Dec. 6, 2013, the contents of which are incorporated herein by reference in their entirety.

STATEMENT REGARDING FEDERALLY SPONSORED RESEARCH OR DEVELOPMENT

Not applicable.

BACKGROUND

This disclosure relates to a vaporized fuel processing apparatus including a canister equipped with an adsorbent adsorbing vaporized fuel generated in a fuel tank, a closing valve provided in a vapor path connecting the canister and the fuel tank to each other, and a purge path connecting the canister and the intake path of an engine to each other.

A pertinent conventional vaporized fuel processing apparatus is disclosed in Japanese Laid-Open Patent Publication No. 2011-256778. The vaporized fuel processing apparatus according to Japanese Laid-Open Patent Publication No. 2011-256778 is equipped with a closing valve (control valve) provided in the vapor path connecting the canister and the fuel tank to each other. The closing valve is equipped with a dead zone region (valve-closing region) shutting off the vaporized fuel, and a conduction region (valve-opening region) allowing the vaporized fuel to pass; in the valve closing state, the fuel tank is maintained in a hermetic state; and, in the valve opening state, the vaporized fuel in the fuel tank is caused to escape to the canister side, making it possible to lower the inner pressure of the fuel tank. In the vaporized fuel processing apparatus according to Japanese Laid-Open Patent Publication No. 2011-256778, learning control is performed as follows. The degree of opening of the closing valve is changed in the opening direction at a predetermined speed from the valve-closing position; and when the inner pressure of the fuel tank begins to be reduced, the degree of opening of the closing valve is stored as the valve opening start position.

However, suppose, for example, the actual inner pressure of the fuel tank is in excess of the measurement range of the pressure sensor for detecting the inner pressure of the fuel tank. In this case, when the learning of the valve opening start position for the closing valve (control valve) is executed, it is impossible to correctly detect with the pressure sensor the timing with which the inner pressure of the fuel tank began to decrease. Thus, the valve opening start position for the closing valve (control valve) would be erroneously learned, resulting in a rather unstable control when performing the pressure control of the fuel tank by using the closing valve (control valve). Accordingly, there is a need for improved vaporized fuel processing apparatuses.

BRIEF SUMMARY

In one aspect of this disclosure, a vaporized fuel processing apparatus has a canister capable of adsorbing vaporized fuel generated in a fuel tank, a vapor path connecting the canister and the fuel tank to each other, a closing valve provided in the vapor path and having a valve seat and a valve movable portion capable of moving in an axial direction of the valve movable portion respect to the valve seat, a purge path connecting the canister and an intake path of an engine to each other, a pressure sensor for detecting the inner pressure of the fuel tank, and an electric control unit (ECU) controlling the vaporized fuel processing apparatus. The ECU controls the vaporized fuel processing apparatus such that the closing valve is in a valve closing state when a stroke amount which is an axial distance between the valve movable portion and the valve seat is within a predetermined range as from zero, and can maintain the fuel tank in a hermetic state, the learning of a valve opening start position being possible based on the stroke amount when the inner pressure of the fuel tank is reduced by an amount not less than a predetermined value through changing of the stroke amount in the valve opening direction; and such that when the inner pressure of the fuel tank is in excess of the measurement range of the pressure sensor, the learning of the valve opening start position is prohibited, and pre-learning depressurization control is performed through gradual change of the stroke amount of the closing valve in the valve opening direction until the inner pressure of the fuel tank is within the measurement range of the pressure sensor.

According to the aspect of this disclosure, when the inner pressure of the fuel tank is beyond the measurement range of the pressure sensor, the learning of the valve opening start position for the closing valve is prohibited, so that it is possible to prevent erroneous learning due to malfunction of the pressure sensor. Further, pre-learning depressurization control is performed through gradual change in the valve opening direction of the stroke amount of the closing valve until the inner pressure of the fuel tank is within the measurement range of the pressure sensor, so that there is no fear of the inner pressure of the fuel tank being abruptly reduced. Thus, after the inner pressure of the fuel tank has been set to be within the measurement range of the pressure sensor, it is possible to perform the learning of the valve opening start position for the closing valve in the normal fashion.

DETAILED DESCRIPTION

Each of the additional features and teachings disclosed above and below may be utilized separately or in conjunction with other features and teachings to provide improved vaporized fuel processing apparatuses. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
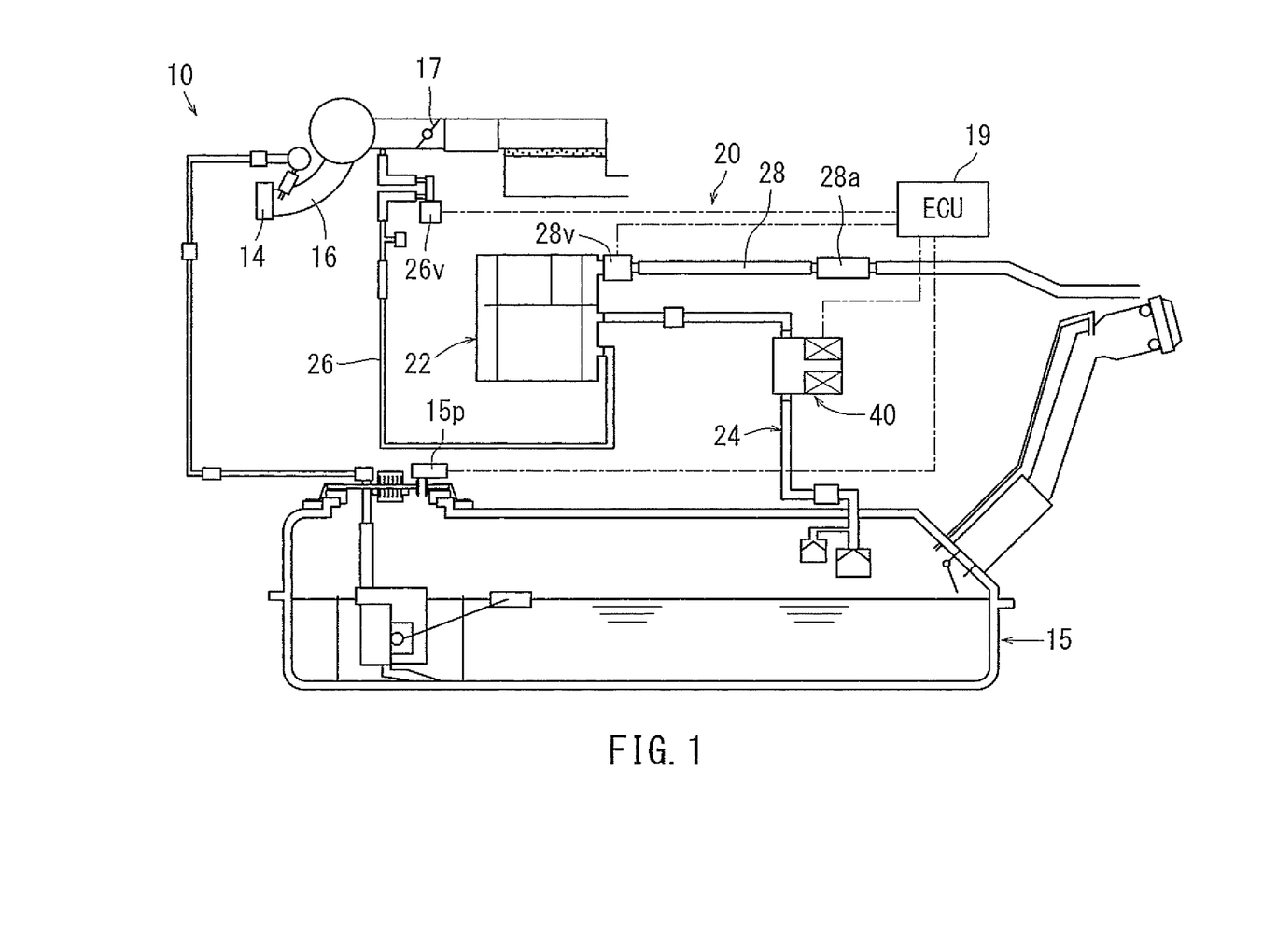
FIG. 1 is a diagram illustrating the construction of a vaporized fuel processing apparatus according to a first embodiment of this disclosure.

A vaporized fuel processing apparatus 20 according to a first embodiment of this disclosure will be described with reference to FIGS. 1 through 11. As shown in FIG. 1, the vaporized fuel processing apparatus 20 of the present embodiment is provided in a vehicle engine system 10; and it is an apparatus which helps to prevent leakage of vaporized fuel from a fuel tank 15 of the vehicle to the exterior.

As shown in FIG. 1, the vaporized fuel processing apparatus 20 is equipped with a canister 22, a vapor path 24 connected to the canister 22, a purge path 26, and an atmosphere path 28. The canister 22 is loaded with activated carbon (not shown) as the adsorbent, and vaporized fuel in the fuel tank 15 is adsorbed by the adsorbent. One end portion (upstream side end portion) of the vapor path 24 communicates with a gaseous layer portion in the fuel tank 15, and the other end portion (downstream side end portion) of the vapor path 24 communicates with the interior of the canister 22. At a midpoint of the vapor path 24, there is provided a closing valve 40 (described below) configured to allow/prohibit communication through the vapor path 24. One end portion (upstream side end portion) of the purge path 26 communicates with the interior of the canister 22, and the other end portion (downstream side end portion) of the purge path 26 communicates with the path portion on the downstream side of a throttle valve 17 in an intake path 16 of an engine 14. At a midpoint of the purge path 26, there is provided a purge valve 26v configured to allow/prohibit communication through the purge path 26. Further, the canister 22 communicates with the atmosphere path 28 via an on-board diagnostics (OBD) component 28v for failure detection. At a midpoint of the atmosphere path 28, there is provided an air filter 28a, and the other end portion of the atmosphere path 28 is open to the atmosphere. The closing valve 40, the purge valve 26v, and the OBD component 28v are controlled based on signals from an electric control unit (ECU) 19. Further, signals from a tank inner pressure sensor 15p for detecting the pressure in the fuel tank 15, etc. are input to the ECU 19.

Next, the basic operation of the vaporized fuel processing apparatus 20 will be described. While the vehicle is at rest, the closing valve 40 is maintained in the closed state. Thus, no vaporized fuel flows into the canister 22 from the fuel tank 15. When an ignition switch of the vehicle is turned on while the vehicle is at rest, there is performed learning control in which the valve opening start position for the closing valve 40 is learned (as described below). Further, while the vehicle is at rest, the purge valve 26v is maintained in the closed state, and the purge path 26 is in the cut-off state, with the atmosphere path 28 being maintained in the communication state. While the vehicle is traveling, when a predetermined purge condition holds good, there is executed a control operation, in which the ECU 19 performs a control operation for purging the vaporized fuel adsorbed by the canister 22. In this control operation, opening/closing control is performed on the purge valve 26v while allowing the canister 22 to communicate with the atmosphere via the atmosphere path 28. When the purge valve 26v is opened, the intake negative pressure of the engine 14 acts on the interior of the canister 22 via the purge path 26. As a result, air flows into the canister 22 via the atmosphere path 28. Further, when the purge valve 26v is opened, the closing valve 40 operates in the valve opening direction to perform depressurization control of the fuel tank 15. As a result, the gas flows into the canister 22 from the fuel tank 15 via the vapor path 24. The adsorbent in the canister 22 is purged by the air, etc. flowing into the canister 22, and the vaporized fuel separated from the adsorbent is guided to the intake path 16 of the engine 14 together with the air before being burnt in the engine 14.

Figure 2:
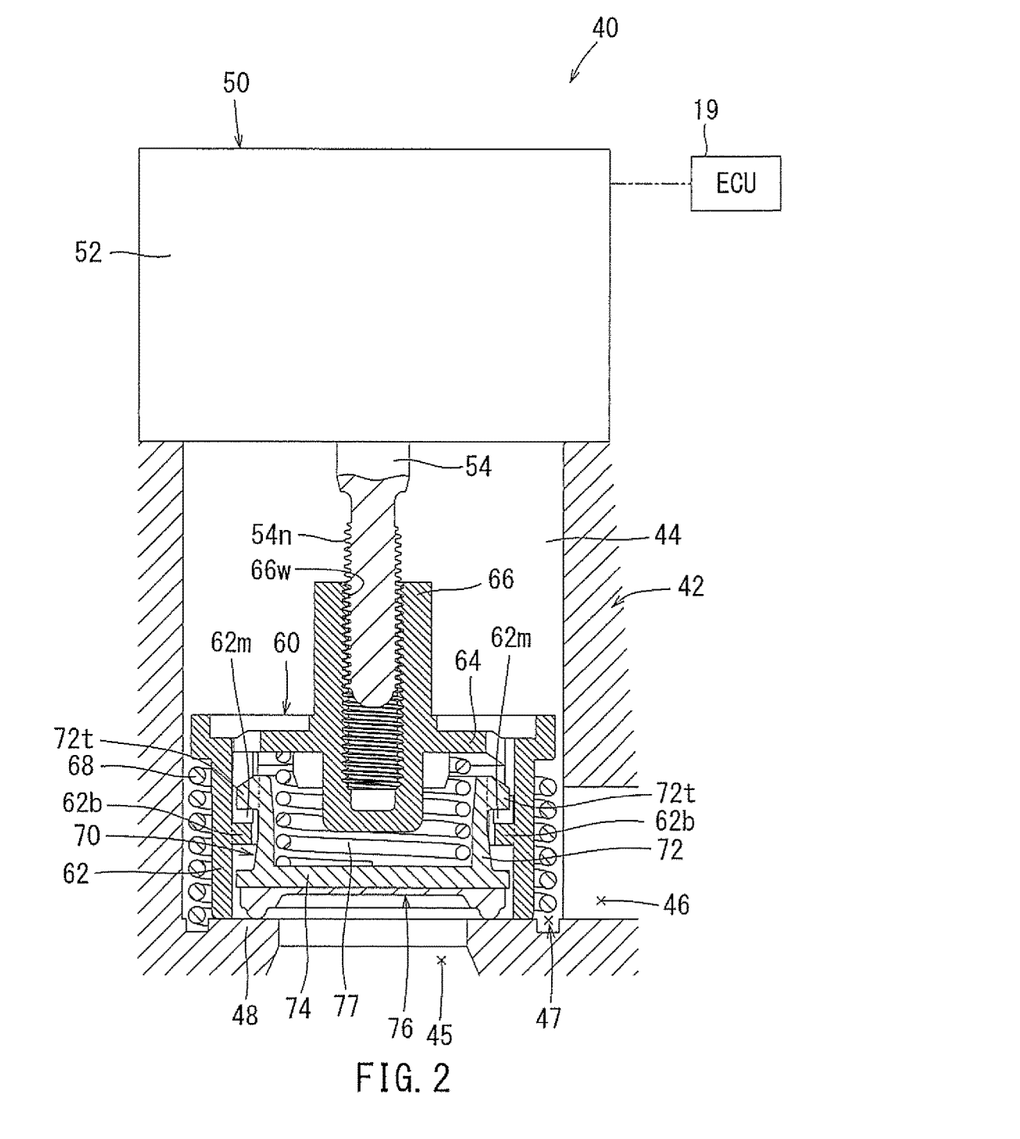
FIG. 2 is a longitudinal sectional view illustrating an initialization state of a closing valve used in the vaporized fuel processing apparatus.

The closing valve 40 is a flow rate control valve configured to close the vapor path 24 in the closed state, and to control the flow rate of the gas flowing through the vapor path 24 in the open state; as shown in FIG. 2, it is equipped with a valve casing 42, a stepping motor 50, a valve guide 60, and a valve body 70. In the valve casing 42, there is formed a continuous, reverse L-shaped fluid passage 47 by a valve chamber 44, an inflow path 45, and an outflow path 46. A valve seat 48 is formed concentrically on the lower surface of the valve chamber 44, that is, at the port edge portion of the upper end opening of the inflow path 45. The stepping motor 50 is installed on top of the valve casing 42. The stepping motor 50 has a motor main body 52, and an output shaft 54 protruding from a lower surface of the motor main body 52 and capable of normal and reverse rotation. The output shaft 54 is concentrically arranged within the valve chamber 44 of the valve casing 42, and a male screw portion 54n is formed on the outer peripheral surface of the output shaft 54.

The valve guide 60 is formed as a topped cylinder by a cylindrical tubular wall portion 62 and an upper wall portion 64 closing the upper end opening of the tubular wall portion 62. At the central portion of the upper wall portion 64, there is concentrically formed a tubular shaft portion 66, and a female screw portion 66w is formed on the inner peripheral surface of the tubular shaft portion 66. The valve guide 60 is arranged so as to be movable in the axial direction (vertical direction) while prohibited from rotating around the axis by a detent means (not shown). The male screw portion 54n of the output shaft 54 of the stepping motor 50 is threadedly engaged with the female screw portion 66w of the tubular shaft portion 66 of the valve guide 60. As a result of the normal and reverse rotation of the output shaft 54 of the stepping motor 50, the valve guide 60 can be raised and lowered in the vertical direction (axial direction). Around the valve guide 60, there is provided an auxiliary spring 68 urging the valve guide 60 upwardly.

The valve body 70 is formed as a bottomed cylinder composed of a cylindrical tubular wall portion 72 and a lower wall portion 74 closing the lower end opening of the tubular wall portion 72. A seal member 76 consisting, for example, of a disc-like member formed of a rubber-like elastic material is attached to a lower surface of the lower wall portion 74. The valve body 70 is concentrically arranged within the valve guide 60, and the seal member 76 of the valve body 70 is arranged so as to be capable of abutting an upper surface of the valve seat 48 of the valve casing 42. A plurality of connection protrusions 72t are circumferentially formed on the outer peripheral surface of the upper end portion of the tubular wall portion 72 of the valve body 70. The connection protrusions 72t of the valve body 70 are fit-engaged with vertical-groove-like connection recesses 62m formed in the inner peripheral surface of the tubular wall portion 62 of the valve guide 60 so as to be capable of relative movement in the vertical direction by a fixed dimension. The valve guide 60 and the valve body 70 are integrally movable upwards (in the valve opening direction), with bottom wall portions 62b of the connection recesses 62m of the valve guide 60 abutting the connection protrusions 72t of the valve body 70 from below. Further, a valve spring 77 constantly urging the valve body 70 downwards, i.e., in the valve closing direction, with respect to the valve guide 60, is concentrically arranged between the upper wall portion 64 of the valve guide 60 and the lower wall portion 74 of the valve body 70.

Next, the basic operation of the closing valve 40 will be described. The closing valve 40 rotates the stepping motor 50 in the valve opening direction or in the valve closing direction by a predetermined number of steps based on an output signal from the ECU 19. When the stepping motor 50 rotates by the predetermined steps, the valve guide 60 moves by a predetermined stroke amount or distance in the vertical direction through threaded engagement action between the male screw portion 54n of the output shaft 54 of the stepping motor 50 and the female screw portion 66w of the tubular shaft portion 66 of the valve guide 60. In the above closing valve 40, setting is made, for example, such that, at the totally open position, the number of steps is approximately 200 and the stroke amount is approximately 5 mm. As shown in FIG. 2, in the initialized state (initial state) of the closing valve 40, the valve guide 60 is retained at the lower limit position, and the lower end surface of the tubular wall portion 62 of the valve guide 60 is in contact with the upper surface of the valve seat 48 of the valve casing 42. In this state, the connection protrusions 72t of the valve body 70 are situated above the bottom wall portions 62b of the connection recesses 62m, and the seal member 76 of the valve body 70 is pressed against the upper surface of the valve seat 48 of the valve casing 42 by the resilient force of the valve spring 77. That is, the closing valve 40 is maintained in the totally closed state. The number of steps of the stepping motor 50 at this time is 0, and the moving amount in the axial direction (upper direction) of the valve guide 60, i.e., the stroke amount in the valve opening direction, is 0 mm. While the vehicle is, for example, at rest, the stepping motor 50 of the closing valve 40 rotates, for example, by 4 steps in the valve opening direction from the initialized state. As a result, the valve guide 60 moves approximately 0.1 mm upwards due to the threaded engagement action between the male screw portion 54n of the output shaft 54 of the stepping motor 50 and the female screw portion 66w of the tubular shaft portion 66 of the valve guide 60, and is maintained in a state in which it is raised from the valve seat 48 of the valve casing 42. As a result, an excessive force is not easily applied between the valve guide 60 of the closing valve 40 and the valve seat 48 of the valve casing 42 due to a change in an environment factor such as temperature. In this state, the seal member 76 of the valve body 70 is pressed against the upper surface of the valve seat 48 of the valve casing 42 due to the resilient force of the valve spring 77.

Figure 3:
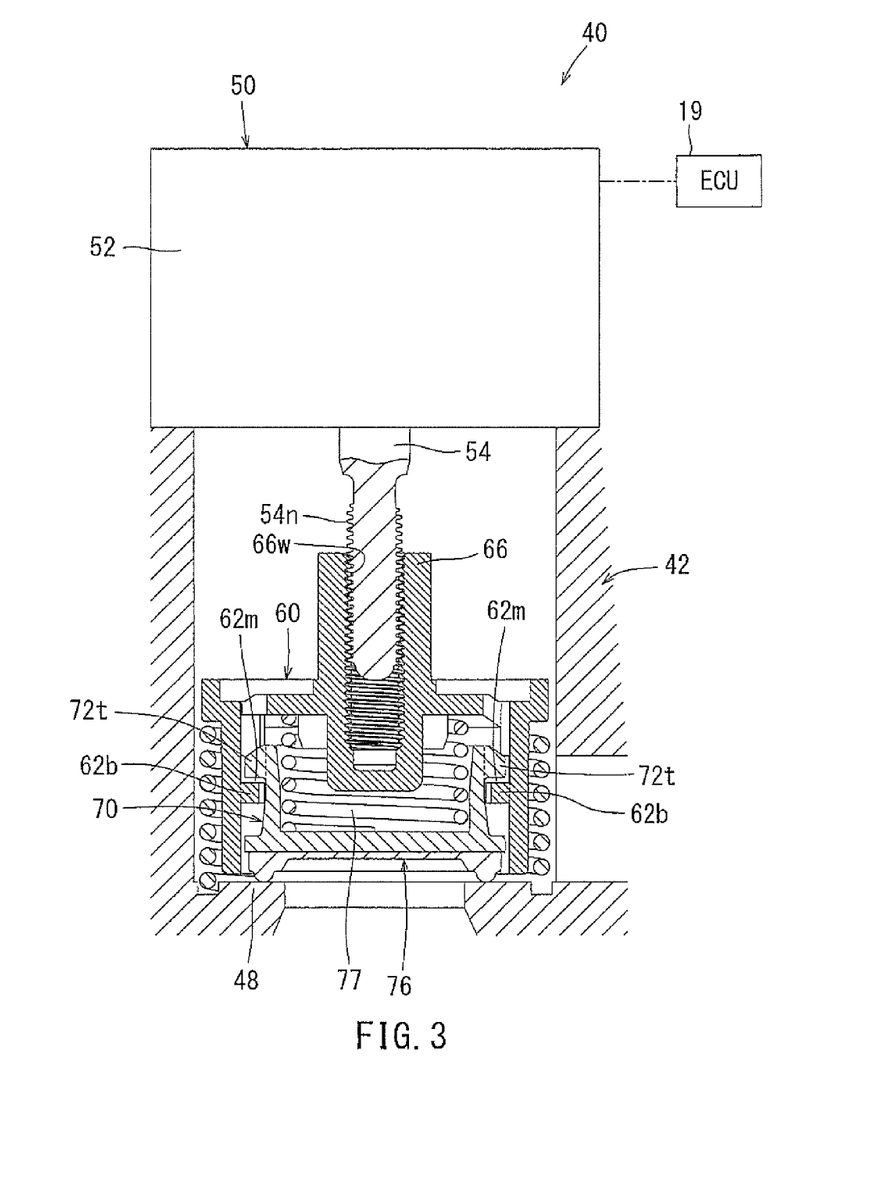
FIG. 3 is a longitudinal sectional view illustrating the valve closing state of the closing valve.
Figure 4:
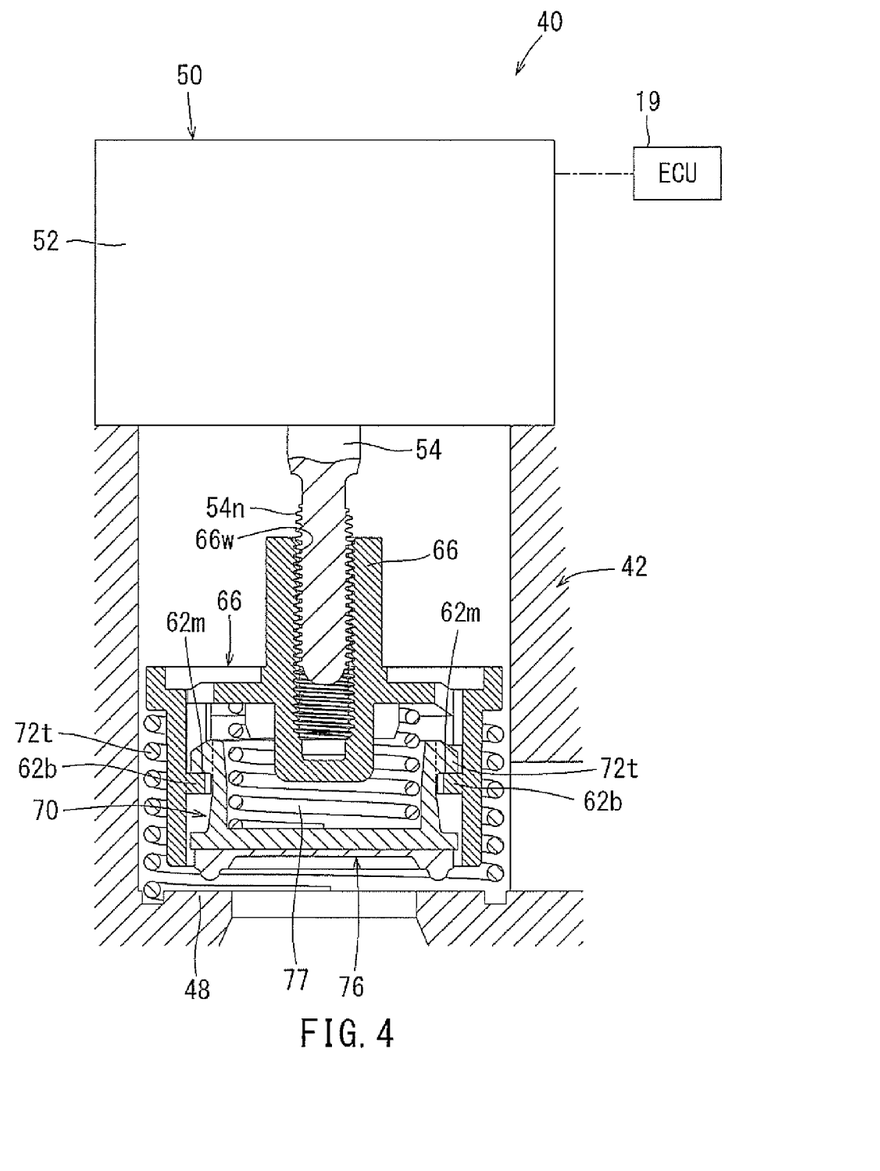
FIG. 4 is a longitudinal sectional view illustrating the valve opening state of the closing valve.

When the stepping motor 50 further rotates in the valve opening direction from the position to which the stepping motor 50 has rotated by 4 steps, the valve guide 60 moves upwards due to the threaded engagement action between the male screw portion 54n and the female screw portion 66w and, as shown in FIG. 3, the bottom wall portions 62b of the connection recesses 62m of the valve guide 60 abut the connection protrusions 72t of the valve body 70 from below. As shown in FIG. 4, when the valve guide 60 moves further upwards, the valve body 70 moves upwards together with the valve guide 60, and the seal member 76 of the valve body 70 is separated from the valve seat 48 of the valve casing 42. As a result, the closing valve 40 is opened. Here, the valve opening start position for the closing valve 40 differs from product to product as a result of the positional tolerance of the connection protrusions 72t formed on the valve body 70, the positional tolerance of the bottom wall portions 62b formed on the connection recesses 62m of the valve guide 60, etc., so that it is necessary to correctly learn the valve opening start position. This learning is performed through the learning control, and the number of steps of the valve opening start position is detected based on the timing with which the inner pressure of the fuel tank 15 is reduced by not less than (i.e., greater than or equal to) a predetermined value while rotating the stepping motor 50 of the closing valve 40 in the valve opening direction (while increasing the number of steps). In this way, when the closing valve 40 is in the closed state, the valve guide 60 corresponds to the valve movable portion of this disclosure, and, when the closing valve 40 is in the open state, the valve guide 60 and the valve body 70 correspond to the valve movable portion of this disclosure. Further, the change in the number of steps of the stepping motor 50 represents the stroke amount (axial moving amount) of the valve guide 60 and the valve body 70; thus, hereinafter, the terms of the number of steps and the stroke amount will be used as synonyms.

Next, the pre-learning depressurization control of the closing valve 40 will be described with reference to FIGS. 5 through 10. As described above, the learning of the valve opening position for the closing valve 40 is performed while rotating the stepping motor 50 of the closing valve 40 in the valve opening direction (increasing the number of steps), and monitoring the reduction in the inner pressure of the fuel tank 15. The number of steps (the stroke amount) of the valve opening start position is obtained based on the number of steps of the closing valve 40 at the timing with which the inner pressure of the fuel tank 15 is reduced by not less than a predetermined value. Thus, to correctly perform the learning of the valve opening start position for the closing valve 40, it is indispensable to correctly detect the inner pressure of the fuel tank 15 (tank inner pressure) by the tank inner pressure sensor 15p, and to input the detection signal to the ECU 19. However, there may be a case, for example, in which the inner pressure of the fuel tank 15 (tank inner pressure) is high, and is beyond the measurement range for the tank inner pressure sensor 15p. In this state, even when the opening of the closing valve 40 is started, and the tank inner pressure is reduced by not less than the predetermined value, the reduction in the tank inner pressure cannot be detected by the tank inner pressure sensor 15p, and it is impossible to correctly perform the learning of the valve opening start position for the closing valve 40. To prevent this, when the tank inner pressure is beyond the measurement range of the tank inner pressure sensor 15*p*, the pre-learning depressurization control is conducted.

Figure 5:
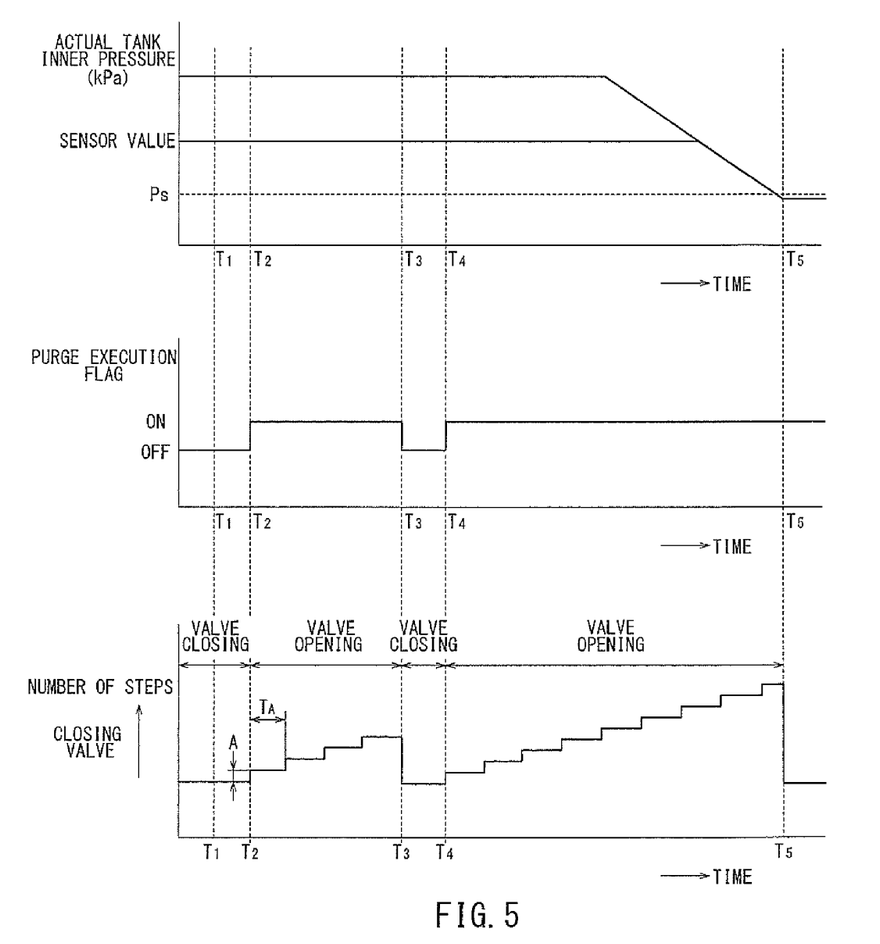
FIG. 5 is a graph illustrating pre-learning depressurization control.
Figure 6:
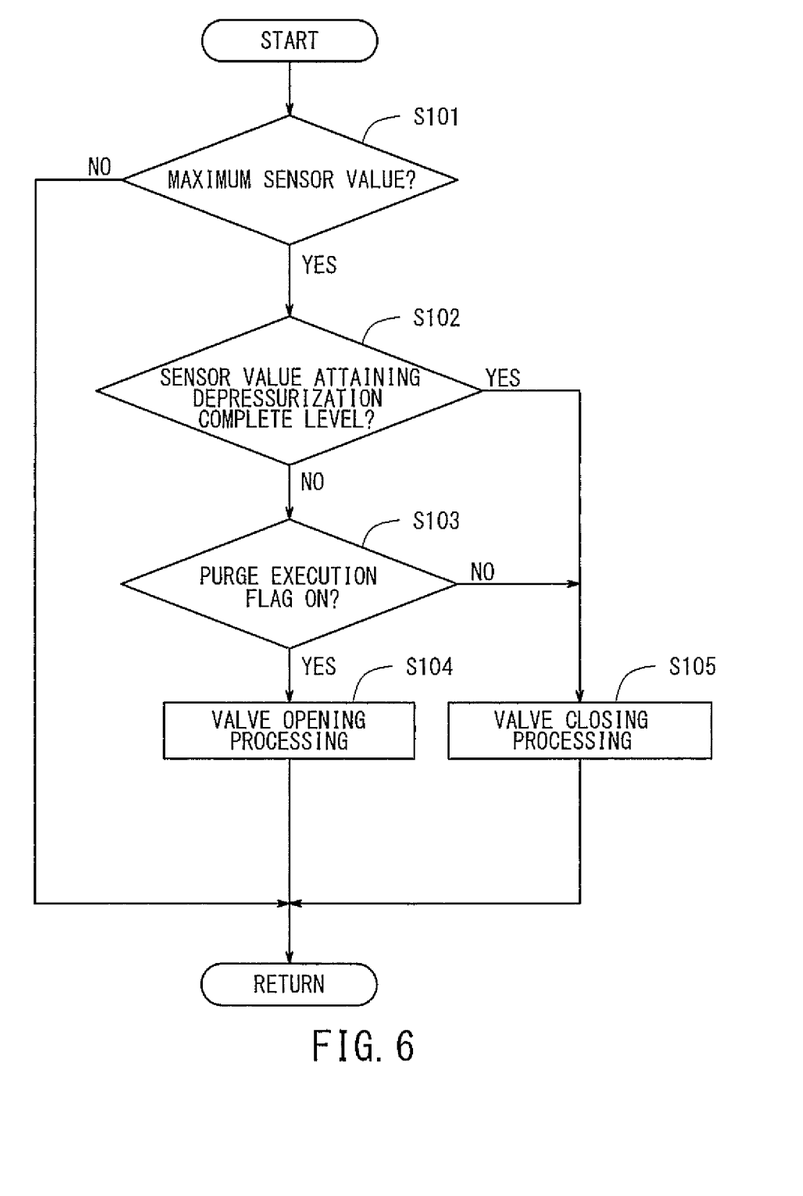
FIG. 6 is a flowchart illustrating the pre-learning depressurization control.

The pre-learning depressurization control is executed according to the procedures as set forth in FIG. 5 and in the flowcharts of FIG. 6. Here, the processing as set forth in the flowchart of FIG. 6 is repeatedly executed for each predetermined time based on a program stored in a storage device of the ECU 19. First, in step S101 of FIG. 6, it is determined whether or not the tank inner pressure is beyond the measurement range of the inner pressure sensor 15*p*, i.e., whether or not the output signal of the tank inner pressure sensor 15*p* is in excess of the upper limit value. It is checked whether or not the tank inner pressure is beyond the measurement range of the inner pressure sensor 15*p* from the ON/OFF output of a sensor value following flag. Assuming, for example, that the present time corresponds to time $T_1$ of FIG. 5, the actual tank inner pressure is beyond the measurement range of the inner pressure sensor 15*p* ("YES" in step S101 of FIG. 6), so that it is determined, in step S102, whether or not the value of the tank inner pressure sensor 15*p* has attained a depressurization complete level Ps. Here, when the sensor value following flag is turned ON, the sensor value following flag is maintained in the ON state until the tank inner pressure attains the depressurization complete level Ps. The depressurization complete level Ps is a tank inner pressure within the measurement range of the tank inner pressure sensor 15*p*; it is a value smaller than the upper limit value of the tank inner pressure sensor 15*p* by a fixed amount. At time $T_1$, the value of the tank inner pressure sensor 15*p* is sufficiently higher than the depressurization complete level Ps ("NO" in step S102), so that it is determined in step S103 whether or not a purge execution flag is ON. Here, the purge execution flag is a flag which is ON when a predetermined purge condition for the canister 22 holds good. When the purge execution flag is ON, the ECU 19 opens the purge valve 26*v* to open the purge path establishing communication between the canister 22 and the intake path 16 of the engine 14. When the purge execution flag is OFF, the purge valve 26*v* is closed to close the purge path 26. At time $T_1$, the purge execution flag is OFF ("NO" in step S103), so that the closing valve 40 is maintained in the closed state (step S105). In this state, the vapor path 24 is closed, and the depressurization of the fuel tank 15 is not effected. Thus, the vaporized fuel does not flow into the canister 22 from the fuel tank 15 via the vapor path 24. If, when the processing of steps S101 through S103 and S105 of FIG. 6 is thus being repeated to execute the valve closing processing, the purge execution flag is turned ON at time $T_2$ of FIG. 5 ("YES" in step S103), the valve opening processing of the closing valve 40 is executed (step S104).

As shown in FIG. 5, in the valve opening processing for the closing valve 40, there is repeatedly executed the process of rotating the stepping motor 50 in the valve opening direction by the number of steps A (e.g., one step) to maintain it in that state for a fixed period of time $T_A$ (e.g., $T_A$=1 sec.). As a result, the stroke amount of the closing valve 40 gradually changes from the closed state to the open state to effect depressurization of the fuel tank 15. That is, the gas in the fuel tank 15 is allowed to escape to the canister 22 via the vapor path 24 and the closing valve 40, and the tank inner pressure is gradually reduced. The vaporized fuel guided into the canister 22 via the vapor path 24 due to the depressurization of the fuel tank 15 is guided to the intake path 16 of the engine 14 via the purge path 26. When, while the processing of steps S101 through S104 of FIG. 6 is being repeatedly executed to depressurize the fuel tank 15 (during the valve opening processing), the purge execution flag is turned OFF as shown at time $T_3$ of FIG. 5 ("NO" in step S103), the valve closing processing for the closing valve 40 is executed (step S105). As a result, the vapor path 24 is closed, and the depressurization of the fuel tank 15 is interrupted.

The processing of steps S101 through S103 and S105 is repeatedly executed, and then when, while the closing valve 40 is in the closed state, the purge execution flag is turned ON at time $T_4$ of FIG. 5 ("YES" in step S103), the valve opening processing for the closing valve 40 is resumed (step S104). That is, as described above, the process of rotating the stepping motor 50 by the number of steps A (e.g., one step) in the valve opening direction and maintaining it in that state for the fixed time $T_A$ (e.g., $T_A$=1 sec), is executed repeatedly to depressurize the fuel tank 15. As a result of the depressurization of the fuel tank 15, the tank inner pressure is gradually reduced, and the value of the tank inner pressure sensor 15*p* attains the depressurization complete level Ps (at time $T_5$ of FIG. 5; "YES" in step S102 of FIG. 6); then, the valve closing processing for the closing valve 40 is executed (step S105). In this state, the pre-learning depressurization control is completed. After this, there is conducted the learning control of the valve opening start position for the closing valve 40. Here, at the point in time when the pre-learning depressurization control is completed, the closing valve 40 is retained, for example, at a standby position. The standby position is a position attained when the stepping motor 50 rotates 8 steps in the valve closing direction from the learning value (the number of steps) at the valve opening start position for the closing valve 40 obtained through the learning control in the past. Thus, when the closing valve 40 receives a signal in the opening direction at the standby position, it is possible to quickly open the valve. That is, the tank inner pressure sensor 15*p* corresponds to the pressure sensor of this disclosure.

In the vaporized fuel processing apparatus 20 according to the present embodiment, when the inner pressure of the fuel tank 15 is beyond the measurement range of the tank inner pressure sensor 15*p*, the learning of the valve opening start position for the closing valve 40 is prohibited, so that it is possible to prevent erroneous learning due to malfunction of the tank inner pressure sensor 15*p*. Further, the pre-learning depressurization control is conducted by gradually changing the stroke amount of the closing valve 40 in the valve opening direction until the inner pressure of the fuel tank 15 is within the measurement range of the inner pressure sensor 15*p*, so that there is no fear of the inner pressure of the fuel tank 15 being abruptly reduced. Thus, after the inner pressure of the fuel tank 15 has been set within the measurement range of the tank inner pressure sensor 15*p*, it is possible to normally conduct the learning of the valve opening position start position for the closing valve 40. When the purge path 26 connecting the canister 22 and the intake path 16 of the engine 14 is closed, the closing valve 40 is maintained in the closed state, and no pre-learning depressurization control is conducted, so that the vaporized fuel having flowed into the canister 22 from the fuel tank 15 via the vapor path 24 fills the canister 22, and is not allowed to leak into the atmosphere from the canister 22.

This disclosure is not restricted to the above-described embodiment. For example, as shown in FIG. 5, etc., in the above-described embodiment, when the depressurization control is conducted again (time $T_4$) after the purge execution flag is turned OFF (time $T_3$ in FIG. 5) to interrupt the pre-learning depressurization control of the fuel tank 15, the stroke amount of the closing valve 40 is gradually changed from the closed state to the open state while repeating the process of rotating the stepping motor 50 in the valve opening direction by the number of steps A (e.g., one step) and maintaining it in that state for the fixed period of time $T_A$ (e.g., TA=1 sec). However, when the interruption time of the depressurization control of the fuel tank 15 is short, it takes time to operate the closing valve 40 up to the stroke amount before the valve closing in the case of the method in which the stroke amount of the closing valve 40 is gradually changed from the closed state in the valve opening direction. Thus, it takes time to perform the pre-learning depressurization control on the fuel tank 15. The pre-learning depressurization control according to a first modification is improved in this respect; it is executed according to the procedures as set forth in FIG. 7 and in the flowchart of FIG. 8. That is, as shown at time $T_1$ of FIG. 7, in the pre-learning depressurization control according to the first modification, when the purge execution flag is turned OFF ("NO" in step S203 of FIG. 8), the purge execution flag at the time of previous processing is checked in step S207 of FIG. 8. Assuming that the previous processing was performed at time $T_0$, the purge execution flag is ON at time $T_0$ of FIG. 7 ("YES" in step S207), so that the stroke amount (the number of steps) of the closing valve 40 at time $T_0$ is stored in step S208. After this, the valve closing processing for the closing valve 40 is executed (step S209). As a result, the vapor path 24 is closed, and the depressurization of the fuel tank 15 is interrupted.

Figure 7:
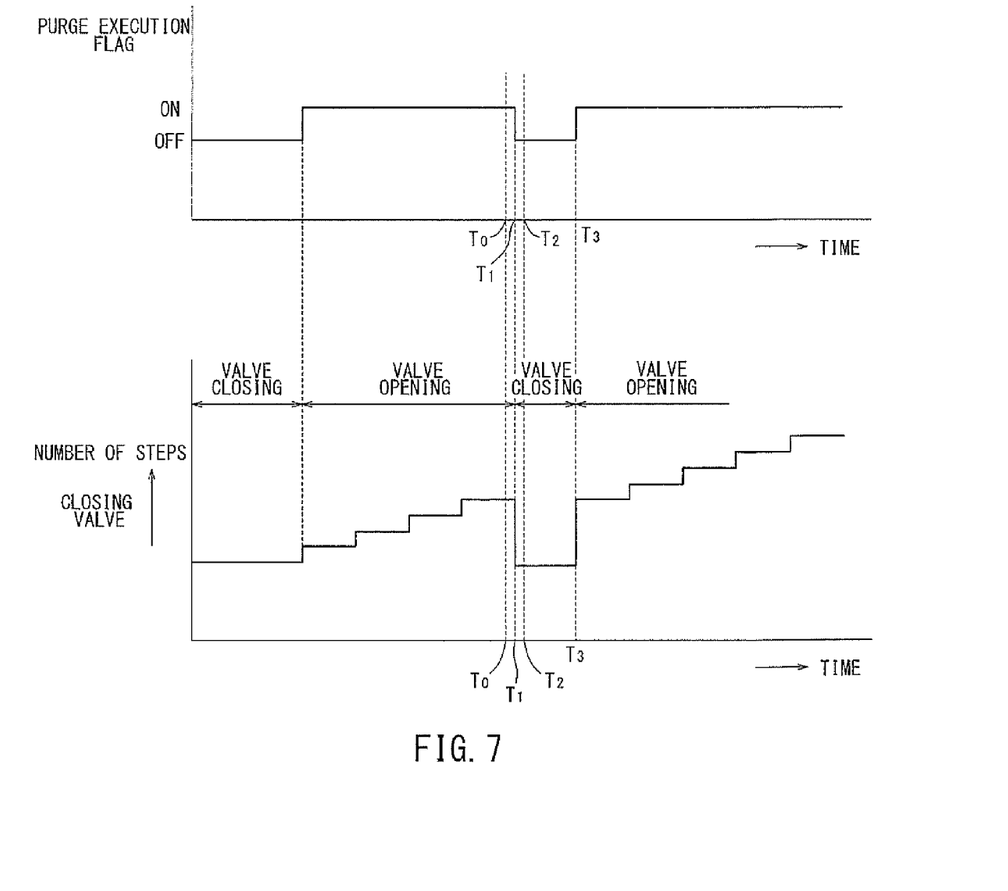
FIG. 7 is a graph illustrating pre-learning depressurization control according to modification 1.
Figure 8:
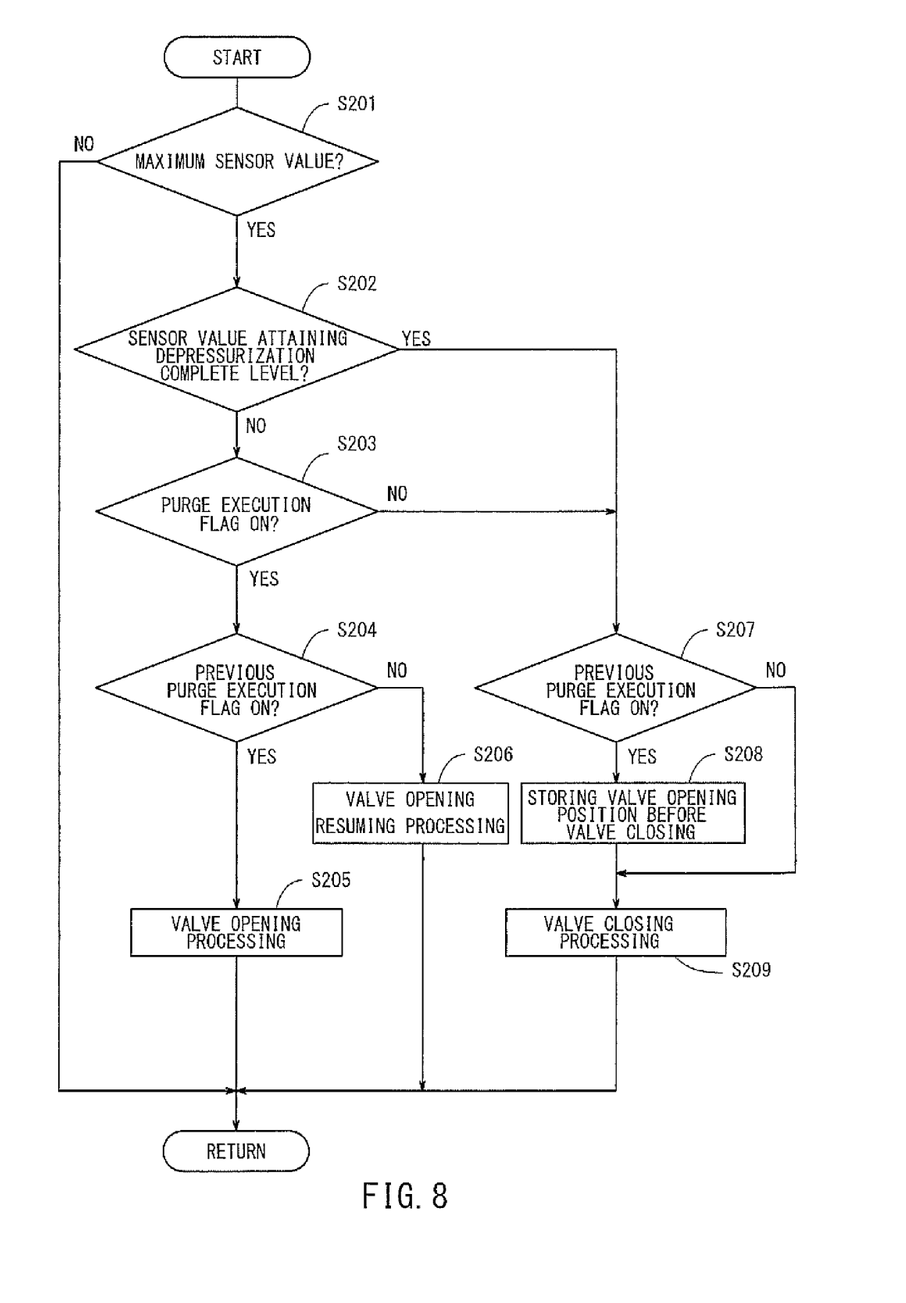
FIG. 8 is a flowchart illustrating pre-learning depressurization control according to a first modification.

Next, at time $T_2$ (succeeding to time $T_1$) of FIG. 7, the tank inner pressure has not attained the depressurization complete level Ps ("NO" in step S202), and the purge execution flag is OFF ("NO" in step S203); further, the purge execution flag of the previous processing (at time $T_1$) is OFF ("NO" in step S207), so that the valve closing processing is continued (step S209). Then, when the processing of steps S201 through S203, S207, and S209 of FIG. 8 is repeatedly executed and then the purge execution flag is turned ON at time $T_3$ in FIG. 7 ("YES" in step S203), it is determined in step S204 whether or not the previous purge execution flag is ON. In the previous processing, the purge execution flag is OFF ("NO" in step S204), so that the valve opening resuming processing is conducted based on the stroke amount (the number of steps) of the closing valve 40 at time $T_0$ when storage was performed (step S206). That is, the closing valve 40 is quickly opened up to the storage stroke amount stored before the closing valve 40 is closed (the number of steps at time $T_0$). Next, the processing of steps S201 through S205 of FIG. 8 is repeatedly executed to execute the valve opening processing. That is, the closing valve 40 is quickly opened up to the number of steps at time $T_0$, and then there is executed the valve opening processing (rotation by steps A and maintenance of $T_A$) in which the stroke amount of the closing valve 40 is gradually changed in the valve opening direction. As a result, it is possible to reduce the time for the pre-learning depressurization control on the fuel tank 15.

Figure 11:
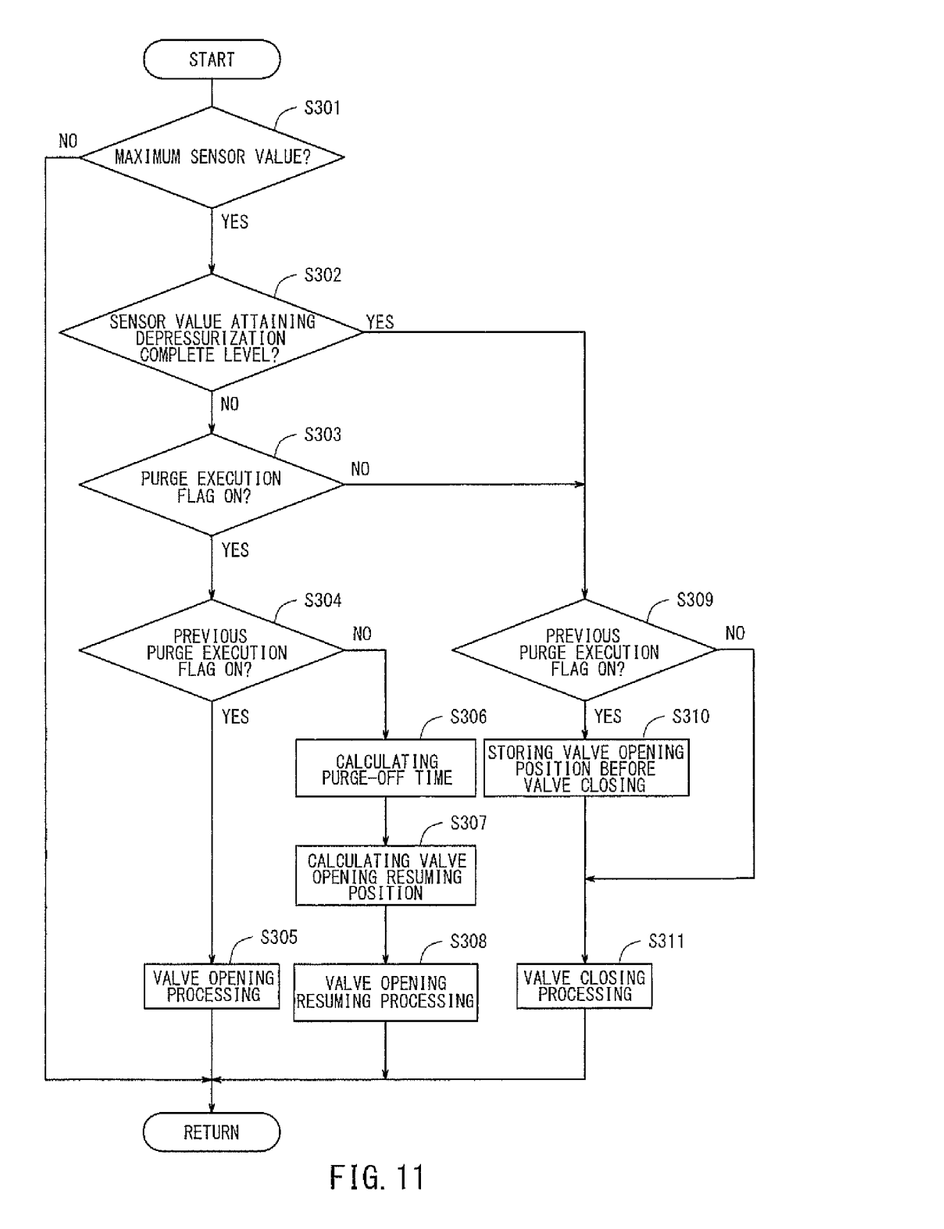
FIG. 11 is a flowchart illustrating the pre-learning depressurization control according to modification 2.

In the first modification, when the purge execution flag is turned ON at time $T_3$ of FIG. 7 ("YES" in step S203 of FIG. 8), the valve opening resuming processing of the closing valve 40 is performed based on the stroke amount (the number of steps) at time $T_0$ stored before the valve closing (step S206). However, when the interruption time (purge-off time) of the pre-learning depressurization control of the fuel tank 15 is long, it can happen that vaporized fuel is newly generated in the fuel tank 15 and is accumulated therein. When, in such cases, the closing valve 40 is opened at high speed up to the stroke amount (the number of steps) at time $T_0$ stored before the valve closing, the vaporized fuel is guided in large quantities to the intake path 16 of the engine 14 from the fuel tank 15 via the vapor path 24, the canister 22, and the purge path 26, with the result that the air-fuel ratio of the engine 14 becomes rich. This is taken into consideration in a second modification. Based on the interruption time of the pre-learning depressurization control of the fuel tank 15 (purge-off time), it is possible to correct the stroke amount (the number of steps) at time $T_0$ stored before the valve closing. That is, as shown at time $T_1$ of FIG. 9, in the pre-learning depressurization control according to the second modification, when the purge execution flag is turned OFF ("NO" in step S303 of FIG. 11), the purge execution flag at the time of previous processing is checked in step S309 of FIG. 11. Assuming that the time of the previous processing is $T_0$, the purge execution flag is ON at time $T_0$ ("YES" in step S309), so that the stroke amount (the number of steps) of the closing valve 40 at time $T_0$ is stored in step S310. Then, the valve closing processing is executed on the closing valve 40 (step S311). As a result, the vapor path 24 is closed, and the depressurization of the fuel tank 15 is interrupted.

Figure 9:
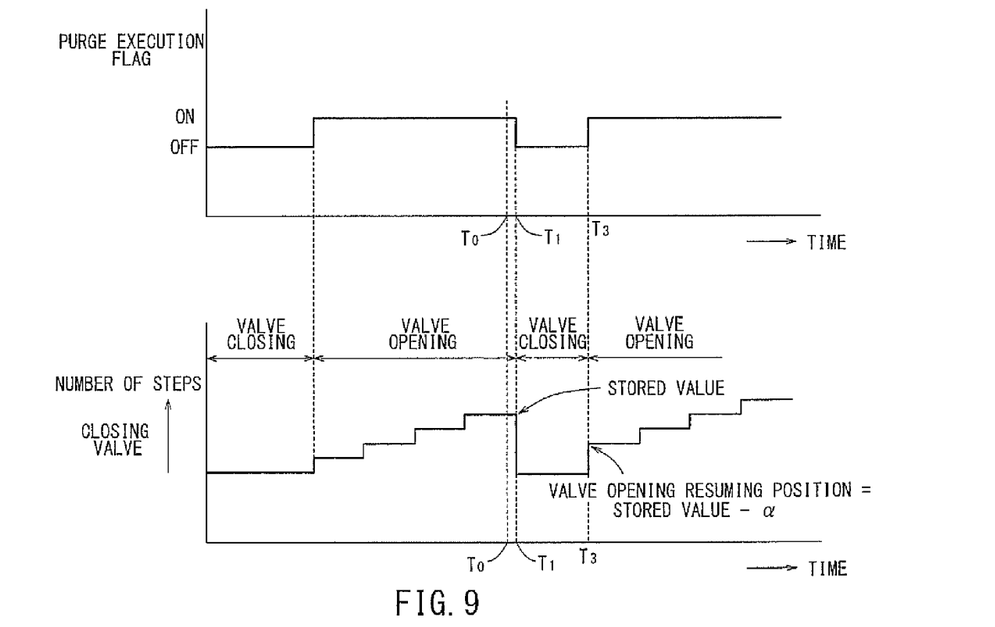
FIG. 9 is a graph illustrating pre-learning depressurization control according to a second modification.
Figure 10:
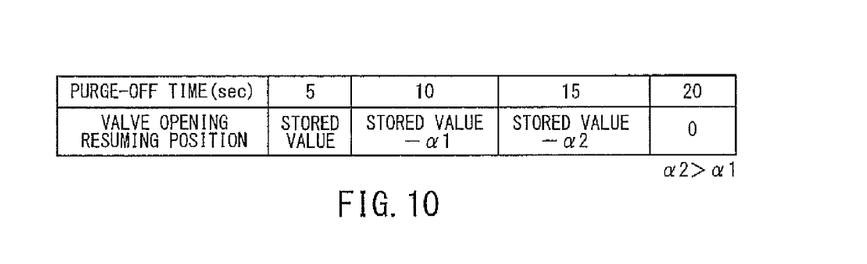
FIG. 10 is a table illustrating relationship between a purge-off time and a valve opening resuming position.

When the purge execution flag is turned ON at time $T_3$ of FIG. 9 ("YES" in step S303 of FIG. 11), it is determined in step S304 whether or not the previous purge execution flag is ON. In the previous processing, the purge execution flag is OFF ("NO" in step S304), so that the interruption time of the pre-learning depressurization control (purge-off time) is calculated in step S306. Based on the purge-off time, the stroke amount (the number of steps) of the closing valve 40 at the time of storage $T_0$ is corrected. Here, the correction of the stroke amount (storage stroke amount) of the closing valve 40 at time $T_0$ based on the purge-off time is conducted based on the table shown in FIG. 10. For example, when the purge-off time is not more than 5 seconds, the correction value is zero, and the storage stroke amount serves as it is as the stroke amount after the correction (correction stroke amount). When the purge-off time is, for example, 10 seconds, the correction stroke amount is the storage stroke amount minus $\alpha 1$. When the purge-off time is, for example, 15 seconds, the correction stroke amount is the storage stroke amount minus $\alpha 2$. Here, $\alpha 2 > \alpha 1$. And, when the purge-off time is 20 seconds or more, the correction stroke amount is zero, that is, the closing valve is at the standby position. When the correction stroke amount is thus obtained, this correction stroke amount is the valve opening resuming position for the closing valve 40 (step S307). Next, the valve opening resuming processing for the closing valve 40 is conducted based on the correction stroke amount (step S308). That is, the closing valve 40 is quickly opened up to the correction stroke amount. In this way, based on the interruption time of the pre-learning depressurization control of the fuel tank 15 (purge-off time), it is possible to correct the stroke amount (storage stroke amount) stored at time $T_0$ before the valve closing, so that it is possible to suppress fluctuation in the air-fuel ratio of the engine 14 when the pre-learning depressurization control is resumed. That is, when the interruption time of the pre-learning depressurization control is long, the correction stroke amount of the closing valve 40 when the pre-learning depressurization control is resumed is smaller than the storage stroke amount. Thus, there is no fear of the vaporized fuel generated in the fuel tank 15 flowing abruptly into the canister due to the resuming of the pre-learning depressurization control. Thus, the vaporized fuel having flowed into the canister 22 does not abruptly flow into the engine 14 via the purge path 26, making it possible to suppress abrupt fluctuation in air-fuel ratio.

Figure 12:
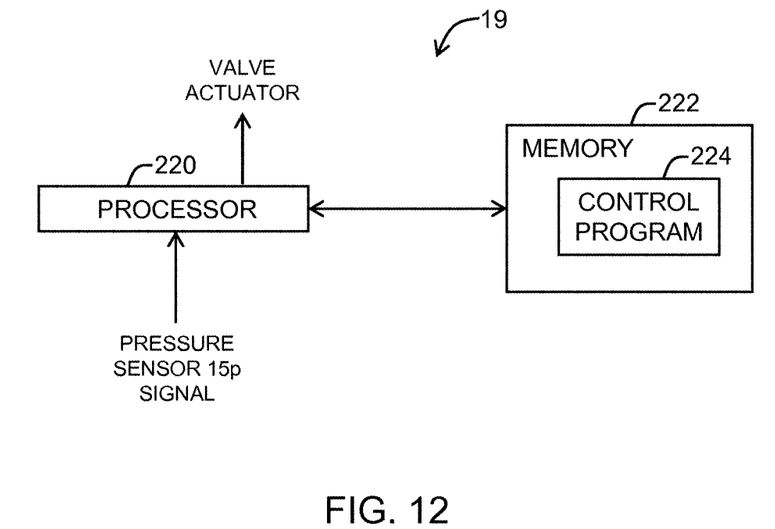
FIG. 12 is a block diagram of an example of a controller to perform a pre-learning depressurization control as disclosed herein.

FIG. 12 shows an example of the ECU 19. In this example, the ECU 19 includes a processor 220 coupled to memory 222. Memory 222 includes a control program 224 which is executed by the processor 220. When the control program 224 is executed, the processor 220 performs any or all of the various functions described herein as attributed to the ECU 19.

For example, the control program 224 may cause the processor 220 to learn the valve opening start position of the valve movable member within the closing valve (e.g., valve 40) based on the stroke amount or distance of the valve movable portion (e.g., valve guide 60) when the inner pressure of the fuel tank 15 (e.g., as measured by sensor 15p) is reduced by an amount greater than or equal to a predetermined value by increasing the stroke amount in accordance with the principles disclosed herein. In addition, the control program 224 may cause the processor 220 to prohibit learning the valve opening start position when the inner pressure within the fuel tank 15 is in excess of the measurement range of sensor 15p and perform a pre-learning depressurization control through increase of the stroke amount until the inner pressure of the fuel tank 15 is within the measurement range of the sensor 15p in accordance with the principles disclosed herein.

While in the embodiments described above the pre-learning depressurization control is interrupted when the purge execution flag is OFF, it is also possible, in the event of emergency, to perform the depressurization control for a short period of time independently of the purge execution flag. Further, while in the embodiments described above the stepping motor 50 is used as the motor of the closing valve 40, it is also possible to use a DC motor or the like instead of the stepping motor 50. It should be appreciated that the stroke amount described herein can be decided and/or detected based on, for example, a value detected by a stroke sensor, or, in embodiments which utilize a stepping motor (e.g., motor 50) the number of steps of the stepping motor.

The invention claimed is:

1. A vaporized fuel processing apparatus comprising:
a canister capable of adsorbing vaporized fuel generated in a fuel tank;
a vapor path connecting the canister and the fuel tank to each other;
a closing valve provided in the vapor path and having a valve seat, a first valve member and a second valve member, the first valve member and the second valve member being capable of moving in an axial direction relative to the valve seat;
a purge path connecting the canister and an intake path of an engine to each other, wherein the purge path includes a purge valve;
a pressure sensor for detecting the inner pressure of the fuel tank, wherein the pressure sensor has a measurement range; and
an electric control unit controlling the vaporized fuel processing apparatus such that the closing valve is in a closed state when a stroke amount, which is a distance between the first valve member and the valve seat along the axial direction, is within a predetermined range as from zero, and such that the second valve member is separated from the valve seat in order to open the closing valve when the stroke amount is in excess of the predetermined range, and the closing valve is configured to maintain the fuel tank in a hermetic state;
wherein the electric control unit is configured to learn a valve opening start position based on the stroke amount when the inner pressure of the fuel tank is reduced by an amount greater than or equal to a predetermined value by increasing the stroke amount;
wherein the electric control unit is configured such that when the inner pressure of the fuel tank is in excess of the measurement range of the pressure sensor, the learning of the valve opening start position is prohibited and a pre-learning depressurization control is performed through increase of the stroke amount of the closing valve in a stepwise manner until the inner pressure of the fuel tank is within the measurement range of the pressure sensor;
wherein the electric control unit is configured to maintain the closing valve in the closed state and not perform the pre-learning depressurization control when the purge path is closed by the purge valve;
wherein the electric control unit is configured to detect the stroke amount when the purge path is closed halfway through the pre-learning depressurization control, store the detected stroke amount, and close the closing valve after detecting the stroke amount in order to interrupt the pre-learning depressurization control; and
wherein the electric control unit is configured to apply a correction to the stored stroke amount based on a time duration of the interruption of the pre-learning depressurization control to result in a corrected stored stroke amount, move the first valve member in the closing valve until the corrected stored stroke amount is attained, and resume the pre-learning depressurization control after the corrected stored stroke amount is attained.

2. The vaporized fuel processing apparatus according to claim 1, wherein the electric control unit is configured to approximate the stroke amount of the closing valve in the closed state as the time duration of the interruption of the pre-learning depressurization control increases.

* * * * *